(12) United States Patent  
Nagase

(10) Patent No.: US 7,565,467 B2  
(45) Date of Patent: Jul. 21, 2009

(54) USB HUB, USB-COMPLIANT APPARATUS, AND COMMUNICATION SYSTEM

(75) Inventor: Toshiyuki Nagase, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 417 days.

(21) Appl. No.: 11/334,560

(22) Filed: Jan. 19, 2006

(65) Prior Publication Data

US 2006/0179144 A1 Aug. 10, 2006

(30) Foreign Application Priority Data

Jan. 27, 2005 (JP) ............................. 2005-020240
Dec. 13, 2005 (JP) ............................. 2005-359181

(51) Int. Cl.
G06F 13/12 (2006.01)
G06F 3/00 (2006.01)
G06F 13/00 (2006.01)

(52) U.S. Cl. ............................. 710/62; 710/8; 710/14; 710/63; 710/107

(58) Field of Classification Search .................. None
See application file for complete search history.

(56) References Cited

U.S. PATENT DOCUMENTS 6,732,218 B2 * 5/2004 Overtoom et al. ............ 710/313
6,963,935 B1    11/2005 Young et al.
2006/0020723 A1 * 1/2006 Chia-Chun .................... 710/62

FOREIGN PATENT DOCUMENTS

JP    2001-156797 A    6/2001
JP         3092152    12/2002
JP    2003-508952 A    3/2003

* cited by examiner

*Primary Examiner*—Alan Chen
(74) *Attorney, Agent, or Firm*—Foley & Lardner LLP

(57) ABSTRACT

A USB hub according to an embodiment of the invention includes: a USB upstream port unit for inputting/outputting data in accordance with a USB protocol; a wireless upstream port unit for inputting/outputting data in accordance with a predetermined wireless communication protocol; a USB downstream port unit including at least one input/output port for inputting/outputting data in accordance with the USB protocol; a port selector for selection between the USB upstream port unit and the wireless upstream port unit to be connected with the input/output port; and a communication protocol converting unit provided on a connection path between the wireless upstream port unit and the port selector and converting the USB protocol and the wireless communication protocol.

21 Claims, 9 Drawing Sheets

USB HUB, USB-COMPLIANT APPARATUS, AND COMMUNICATION SYSTEM

BACKGROUND OF THE INVENTION

1. Field of the Invention

The present invention relates to a USB hub capable of switching an upstream communication method between a communication method conforming to USB standard and a wireless communication method not conforming to the USB standard.

2. Description of Related Art

The USB (Universal Serial Bus) standard is communication interface standard that enable data transmission/reception between a single USB host and plural USB devices. USB standard compliant interfaces have been widely used as communication interface that mainly define a PC as the USB host and its peripheral devices as the USB devices to enable connection between the PC and the peripheral devices. The USB standard adopts a star-shaped logical bus topology that a single USB host is connected with plural USB devices. The USB 2.0 standard released in April, 2000 defines three bus transport speeds: a low speed (LS) of 1.5 Mbit/s, a full speed (FS) of 12 Mbit/s, and a high speed (HS) of 480 Mbit/s.

Further, a physical bus topology of the USB is star topology. The USB hub is arranged at each branching point of a bus, and plural USB devices or other USB hubs are connected downstream from the USB hub to constitute a star-shaped bus where the USB host is situated at the center. Incidentally, in the following description, one side of a USB hub connected with USB devices is called a downstream side, and the other side connected with a USB host is called an upstream side.

FIG. 9 shows the configuration of a conventional USB hub 30. USB devices 3 are connected to series A receptacles 321 to 325 provided on a downstream side of the USB hub 30. A USB host 2 is connected to a series B receptacle 39 provided on an upstream side of the USB hub 30. Incidentally, USB hub functions of the USB hub 30 are integrated in a USB hub/controller IC 31.

A wired USB downstream port 34 has a function of buffering data input to or output from the USB devices 3 and a transceiver function conforming to USB 2.0 standard. Wired USB downstream port terminals 331 to 335 are input/output terminals for the wired USB downstream port 34, more specifically, connecting terminals including two signal lines (D+ and D−) conforming to the USB 2.0 standard.

A wired USB downstream port control unit 35 is a control circuit for controlling the wired USB downstream port 34. In addition, a wired USB hub control unit 36 is a circuit unit for executing processings conforming to the USB 2.0 standard such as a processing of transferring data between the wired USB upstream port 37 and the wired USB downstream port 34, a processing of detecting a bus transport speed, and a transaction dividing processing.

A wired USB upstream port 37 has a function of buffering data input to or output from the USB host 2 and a transceiver function conforming to USB 2.0 standard. An upstream USB port terminal 38 is an input/output terminal for the wired USB upstream port 37.

Based on such a configuration, the USB hub 30 transfers data (OUT data) sent from the USB host 2 to the USB devices 3, and in turn, the USB hub 30 aggregates input data (IN data) sent from the USB devices 3 towards the USB host 2 and transfers the data to the USB host 2.

A USB hub that communicates with a host via a radio link and a device that allows data transfer between a USB hub and USB devices via a radio link have been hitherto proposed besides the aforementioned USB hub 30 (see Japanese Patent Translation Publication No. 2003-508952, Japanese Unexamined Patent Publication No. 2001-156797, and Japanese Utility Model No. 3092152, for example).

The above USB hub should overcome the following problems in order to switch an upstream communication method between a communication method conforming to the USB 2.0 standard and a wireless communication method not conforming to the USB 2.0 standard.

The USB 2.0 standard and the wireless communication method adopt different communication protocols for media access control or the like. For example, in the communication conforming to the USB 2.0 standard, plural transactions are scheduled on a basis of 125 µs-frame on a high speed (HS) bus having a bus transport speed of 480 Mbit/s to execute each transaction on the 125 µs-frame basis. On the other hand, as for the wireless communication method, data transfer is not carried out based on the frame of 125 µs unlike the USB 2.0 standard. For example, the IEEE802.15.3 standard adopts a frame structure called a superframe using a beacon, but a unit length of the superframe is not 125 µs.

Further, the wireless communication method includes media access control different from that of the wired communication method conforming to the USB 2.0 standard. For example, in a superframe of the IEEE 802.15.3 standard, a beacon interval is divided into a CAP (Contention Access Period) and a CTAP (Channel Time Allocation Period). The CAP is shared among all IEEE 802.15.3-compliant devices (all devices conforming to the IEEE 802.15.3 standard), and during the CAP, all the IEEE 802.15.3-compliant devices can make accesses. On the other hand, during the CTAP, a specific IEEE 802.15.3-compliant device is exclusively allowed to make an access. During the CAP, the media access control is executed based on a CSMA/CA (Carrier Sense Multiple Access with Collision Avoidance) method, while during the CTAP, the media access control is executed based on a TDMA (Time Division Multiple Access) method.

As mentioned above, a USB communication protocol and a wireless communication protocol differ from each other in terms of the frame structure and media access control method, so a communication protocol needs to be changed such as converting a packet structure in accordance with a wireless communication protocol or changing a transfer unit of packetized data instead of directly transferring USB packets to the wireless communication side.

FIG. 10 shows a structural example of a USB-compliant apparatus 40 capable of switching an upstream communication method between a communication method conforming to the USB 2.0 standard (wired USB) and a wireless communication method. Each element of the USB-compliant apparatus 40 is described below. Upper layer functional parts 411 to 413 operate as USB 2.0 standard-compliant USB devices. Wireless I/Fs 421 to 423 are interface units for adapting signals input to the upper layer functional parts 411 to 413 and signals output from the upper layer functional parts 411 to 413 to an upstream wireless communication method. On the other hand, wired USB I/Fs 431 to 433 are interface units as USB 2.0 standard-compliant USB devices for the upper layer functional parts 411 to 413.

A selector/arbiter circuit 44 selects and arbitrates connections between the wireless I/Fs 421 to 423 and a wireless upstream port 46. A wireless control unit 45 controls a data transfer timing in accordance with a wireless communication protocol used in the wireless upstream port 46. The wireless upstream port 46 has a function of buffering data input to or output from a wireless host (not shown) and a modulating/demodulating function. An antenna 47 is a wireless communication antenna.

As described above, the wireless communication method and the wired communication method conforming to the USB 2.0 standard differ from each other in terms of a communication protocol as well as physical interface characteristics such as input/output conditions. Therefore, in order to obtain an apparatus adaptable to both of a wired communication protocol and a wireless communication protocol on an upstream side, independent interfaces should be provided to each of the upper layer functional parts 411 to 413 in conformity with the wireless communication protocol and the wired USB communication protocol. Further, it is necessary to provide the selector/arbiter circuit 44 in addition to the wired USB downstream port 34 and the wired USB downstream port control unit 35 in order to select and arbitrate connections between the wireless I/Fs 421 to 423 and the upstream port.

In this way, when a USB hub or USB-compliant apparatus is structured such that an upstream communication method is selectable between a communication method conforming to the wired USB standard and a wireless communication method not conforming to the wired USB standard, it is difficult to downsize the USB-compliant apparatus or the USB hub.

SUMMARY OF THE INVENTION

A USB hub according to an aspect of the invention includes: a USB upstream port unit for inputting/outputting data in accordance with a USB protocol; a wireless upstream port unit for inputting/outputting data in accordance with a predetermined wireless communication protocol; a USB downstream port unit including at least one input/output port for inputting/outputting data in accordance with the USB protocol; a port selector for selecting between the USB upstream port unit and the wireless upstream port unit to be connected with the USB downstream port unit; and a communication protocol converting unit provided on a connection path between the wireless upstream port unit and the port selector and converting the USB protocol and the wireless communication protocol.

With such a structure, interfaces applied to downstream side from the port selector are standardized into a USB interface. That is, even if an upstream communication protocol is switched between a USB protocol and a wireless communication protocol, interfaces with a device connected with a downstream USB port can be standardized into the USB interface. Consequently, the USB hub according to the present invention can simplify the structure of a portion of a USB-compliant apparatus necessary for converting interfaces and enables a smaller apparatus size.

Further, a USB-compliant apparatus according to another aspect of the invention includes: a USB upstream port unit for inputting/outputting data in accordance with a USB protocol; a wireless upstream port unit for inputting/outputting data in accordance with a predetermined wireless communication protocol; at least one upper layer functional part for inputting/outputting data in accordance with the USB protocol; a port selector for selecting between the USB upstream port unit and the wireless upstream port unit to be connected with the upper layer functional part; and a communication protocol converting unit provided on a connection path between the wireless upstream port unit and the port selector and converting the USB protocol and the wireless communication protocol.

With such a structure, interfaces of the upper layer functional part can be standardized into a USB interface. Consequently, it is unnecessary to change an interface of each upper layer functional part in conformity with the USB protocol or the wireless communication protocol, making it possible to downsize an apparatus.

According to the present invention, it is possible to downsize a USB hub and a USB-compliant apparatus capable of switching an upstream communication method between a communication method conforming to the wired USB standard such as the USB 2.0 standard and a wireless communication method not conforming to the wired USB standard. Further, the USB-compliant apparatus can be designed only in consideration of a USB interface as an interface in the apparatus, not in consideration of both of the USB interface and the wireless communication interface.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

Figure 1:
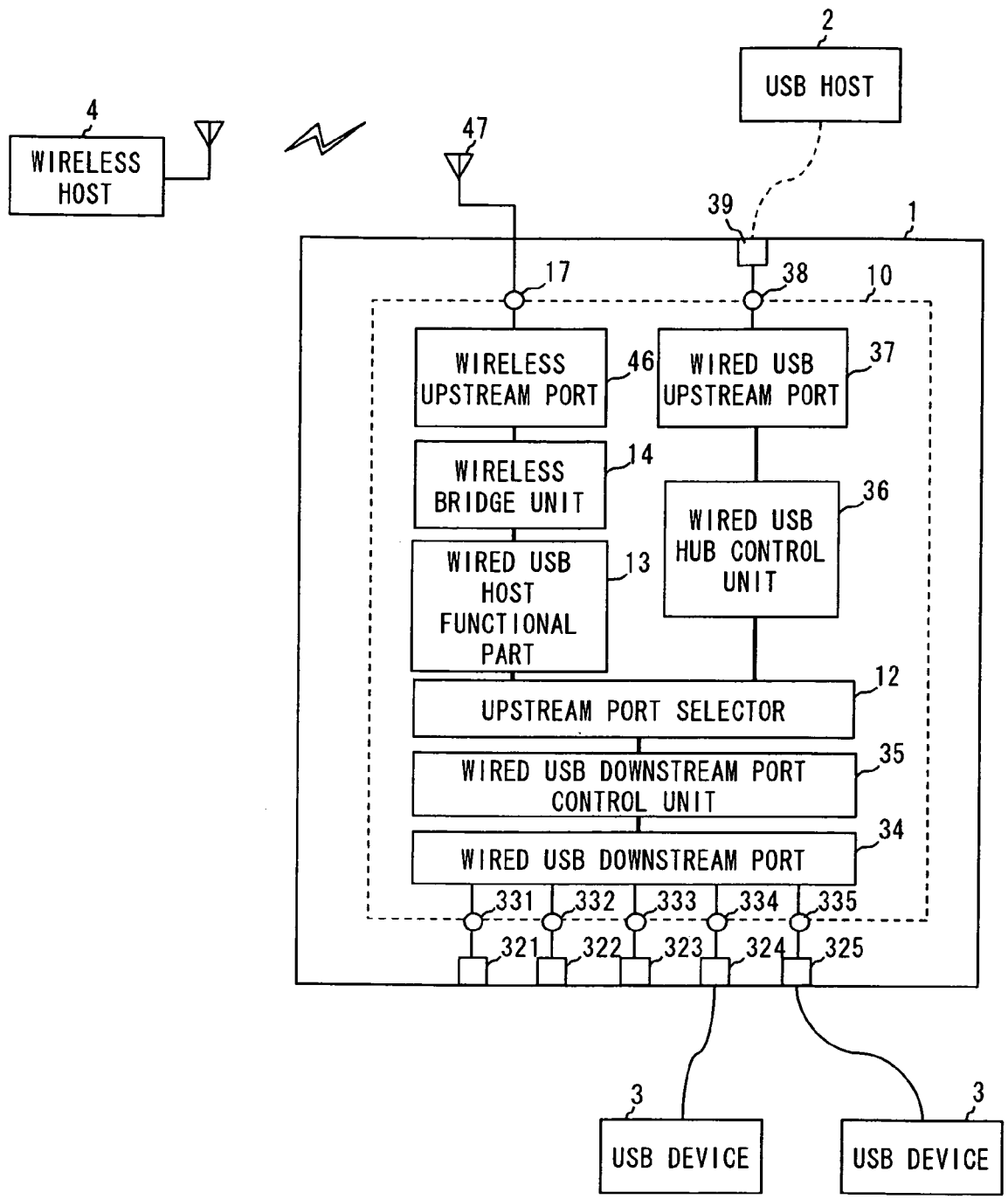
FIG. 1 is a diagram of a USB communication system according to a first embodiment of the present invention.

The invention will be now described herein with reference to illustrative embodiments. Those skilled in the art will recognize that many alternative embodiments can be accomplished using the teachings of the present invention and that the invention is not limited to the embodiments illustrated for explanatory purposed.

A USB hub according to the present invention is configured as below. That is, the USB hub according to the present invention includes: a USB upstream port unit for inputting/outputting data in accordance with a USB protocol; a wireless upstream port unit for inputting/outputting data in accordance with a predetermined wireless communication protocol; a USB downstream port unit including at least one input/output port for inputting/outputting data in accordance with the USB protocol; a port selector for selecting between the USB upstream port unit and the wireless upstream port unit to be connected with the USB downstream port unit; and a communication protocol converting unit provided on a connection path between the wireless upstream port unit and the port selector and converting the USB protocol and the wireless communication protocol.

More specifically, the communication protocol converting unit includes: a USB host functional part acting as a USB host for a USB device connected to the USB downstream port unit; and a wireless bridge unit for relaying data between the wireless upstream port unit and the USB host functional part.

Further, it is preferable that the port selector selects between the USB upstream port unit and the wireless upstream port unit to be connected with the USB downstream port unit based on an externally supplied control signal or based on whether or not the USB upstream port unit can input/output data to/from a USB host device.

Further, desirably, an operation of at least one of the wireless upstream port unit and the communication protocol converting unit is stopped based on a situation that the USB upstream port unit is selected to be connected with the USB downstream port unit.

On the other hand, a USB-compliant apparatus according to the present invention includes: a USB upstream port unit for inputting/outputting data in accordance with a USB protocol; a wireless upstream port unit for inputting/outputting data in accordance with a predetermined wireless communication protocol; at least one upper layer functional part for inputting/outputting data in accordance with the USB protocol; a port selector for selecting between the USB upstream port unit and the wireless upstream port unit to be connected with the upper layer functional part; and a communication protocol converting unit provided on a connection path between the wireless upstream port unit and the port selector and converting the USB protocol and the wireless communication protocol.

Further, a communication system according to the present invention includes the USB hub of the present invention, and a host and a USB device communicating with the USB hub of the present invention.

The host includes: a USB port unit capable of transmitting/receiving data to/from the USB upstream port unit in accordance with the USB protocol; and a wireless port unit capable of transmitting/receiving data to/from the wireless upstream port unit in accordance with the wireless communication protocol, and selects one of the USB port unit and the wireless port unit to transmit/receive data to/from the USB hub.

The USB device is connected with the USB downstream port unit and communicates with the host via the USB hub.

A USB hub, a USB-compliant apparatus, and a communication system according to embodiments of the present invention are described below in detail.

First Embodiment

Figure 9:
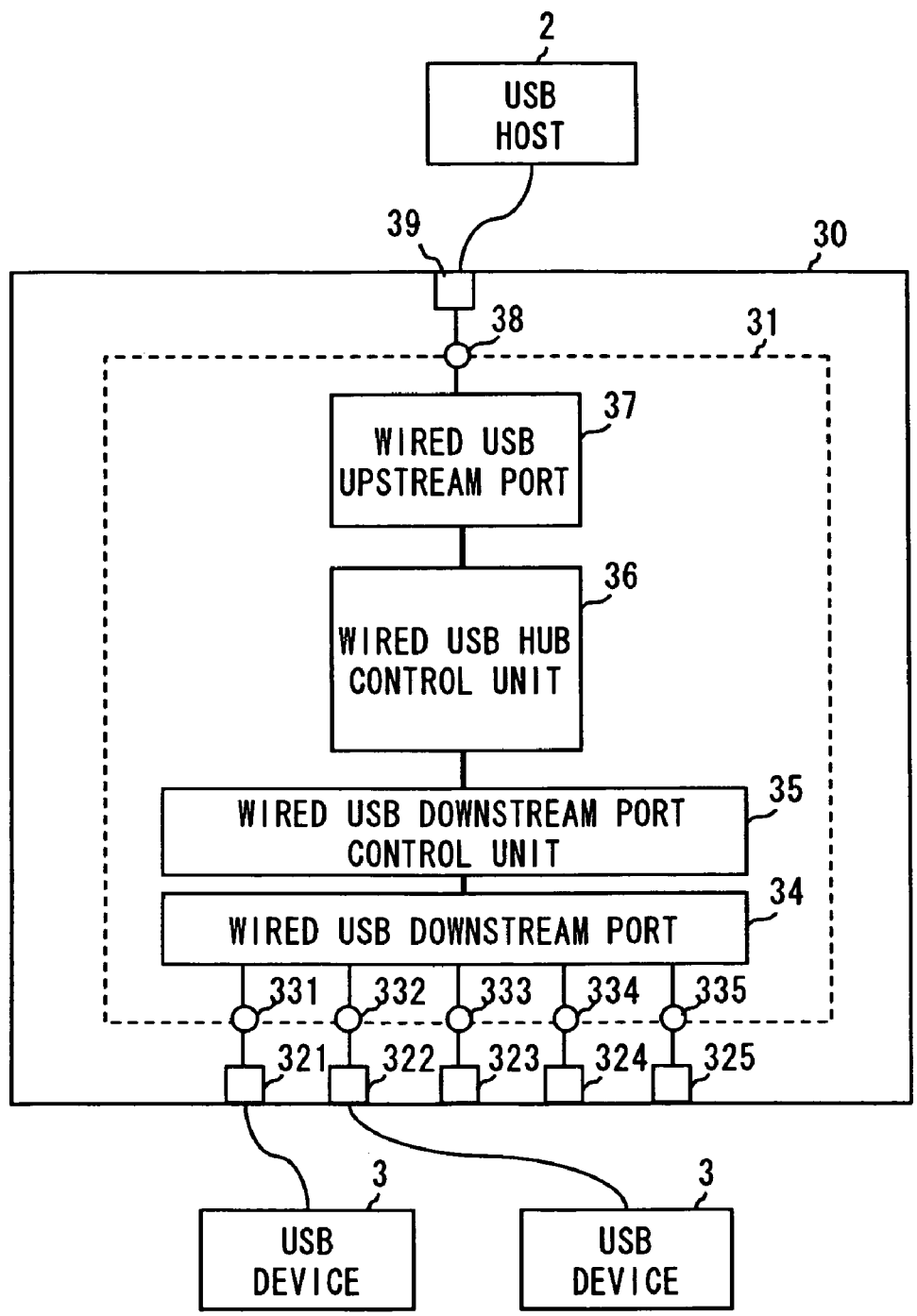
FIG. 9 is a diagram of a conventional USB communication system.

FIG. 1 shows the structure of a USB hub 1 according to a first embodiment of the present invention. In the following description, components of the USB hub 1 are discussed, but the same components as those of a conventional USB hub 30 shown in FIG. 9 are denoted by like reference numerals and their description is omitted.

The USB hub 1 is structured such that signals input to or output from USB devices 3 are accommodated to series A receptacles 321 to 325 on a downstream side, and on an upstream side, a wired USB (USB 2.0) port and a wireless communication port can be selected. Incidentally, in FIG. 1, the number of series A receptacles 321 to 325 to be connected with the USB devices 3 and the number of connected USB devices 3 maybe arbitrarily set. The USB hub 1 needs only to be connected with at least one USB device 3. Further, a wireless communication method adopted for communication with a wireless host 4 on an upstream side conforms to, for example, a wireless LAN standard such as IEEE 802.11, IEEE 802.15.1, IEEE 802.15.3, and IEEE 802.15.4, or UWB technique; a wireless communication technique such as a wireless USB under discussion may be adopted.

A USB hub/controller IC 10 of the USB hub 1 includes an upstream port selector 12 on an upstream side of a wired USB downstream port control unit 35. The upstream port selector 12 is a selector circuit for switching a wired USB hub control unit 36 and a wired USB host functional part 13 to be connected with the wired USB downstream port control unit 35.

The wired USB host functional part 13 exerts a USB host function. When the USB hub 1 communicates with the USB host 2 via the wired USB upstream port 37, the USB host 2 controls a timing of sending a transfer request to the downstream USB devices 3. In contrast, when the USB hub 1 communicates with the wireless host 4 via the wireless upstream port 46, the wired USB host functional part 13 executes processings such as receiving a transfer request to trigger data transfer to the downstream USB devices 3 from the wireless host 4, generating USB packets transferred to the USB devices 3, determining a USB packet transfer timing, and generating a transfer result. After the completion of all the processings based on the transfer request from the wireless host, the wired USB host functional part 13 sends the transfer result to the wireless host 4 via the wireless bridge unit 14 and the wireless upstream port 46.

In summary, the wired USB host functional part 13 is provided, whereby the USB devices 3 connected downstream from USB hub 1 execute USB transactions with the USB hub 1. Hence, the downstream USB devices 3 can operate regardless of the wireless upstream devices.

The wireless bridge unit 14 converts a communication protocol between the downstream wired USB interface and the upstream wireless interface to relay data between a downstream wired USB data transfer network and an upstream wireless data transfer network. More specifically, a frame structure or other such data format is converted between a wireless side and a wired USB side. Further, in the case of sending data received from the wireless host 4 to the USB devices 3, an address of a target USB device 3 is added to USB-packetized data and the obtained data is sent to the downstream side. Conversely, in the case of sending data received from the USB device 3 to the wireless host 4, an address of the USB device as a sender is added to data to be transmitted to the wireless host 4, and the obtained data is sent to the upstream wireless host 4 via the wireless upstream port 46 and an wireless upstream port terminal 17.

In the following description, communication between the wireless host 4 and the USB hub 1 via a wireless USB is taken as an example, and the structure and operation of the wired USB host functional part 13 and the wireless bridge unit 14 are explained in detail.

Figure 2:
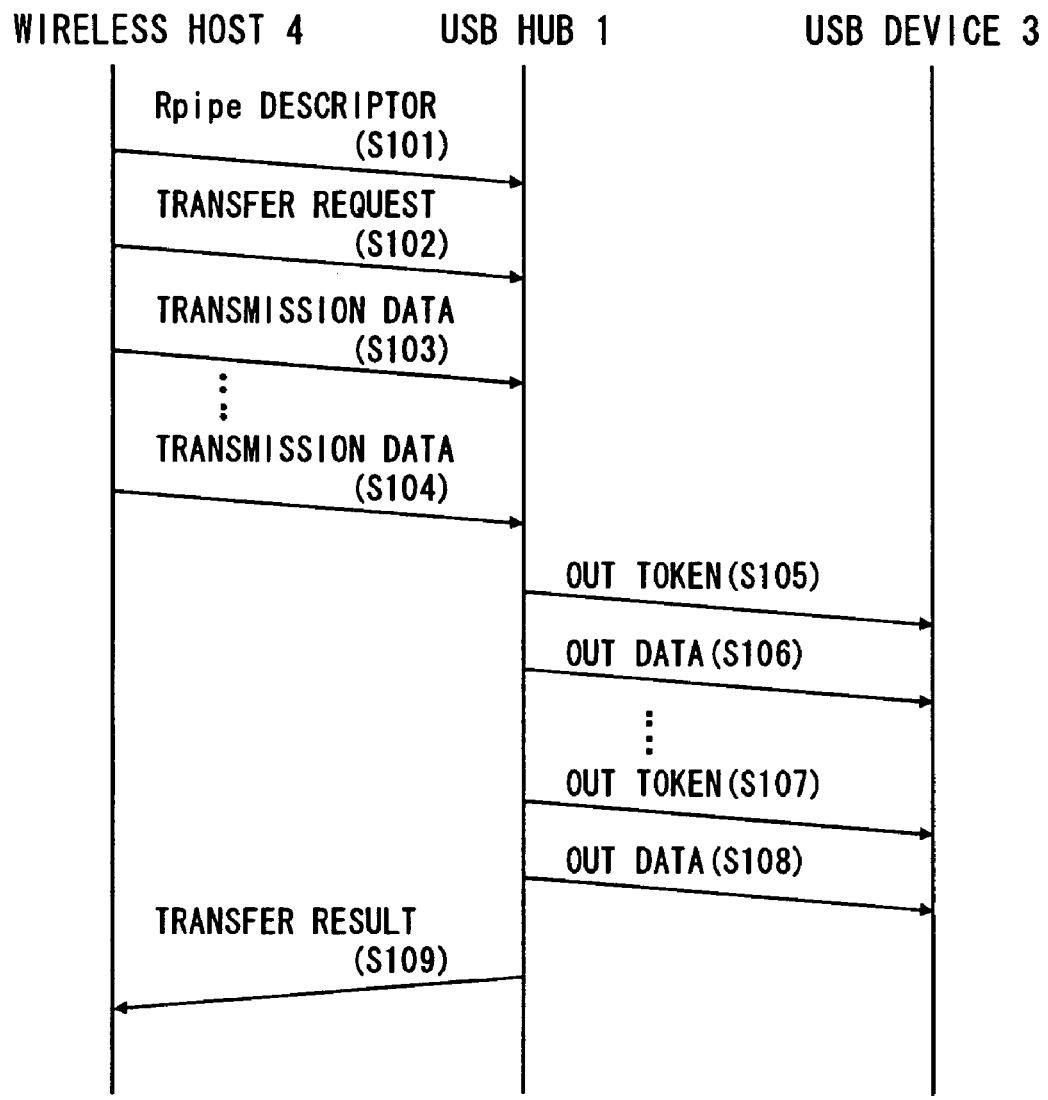
FIG. 2 is a timing chart showing how data is transferred via the USB hub according to the first embodiment of the present invention.
Figure 3:
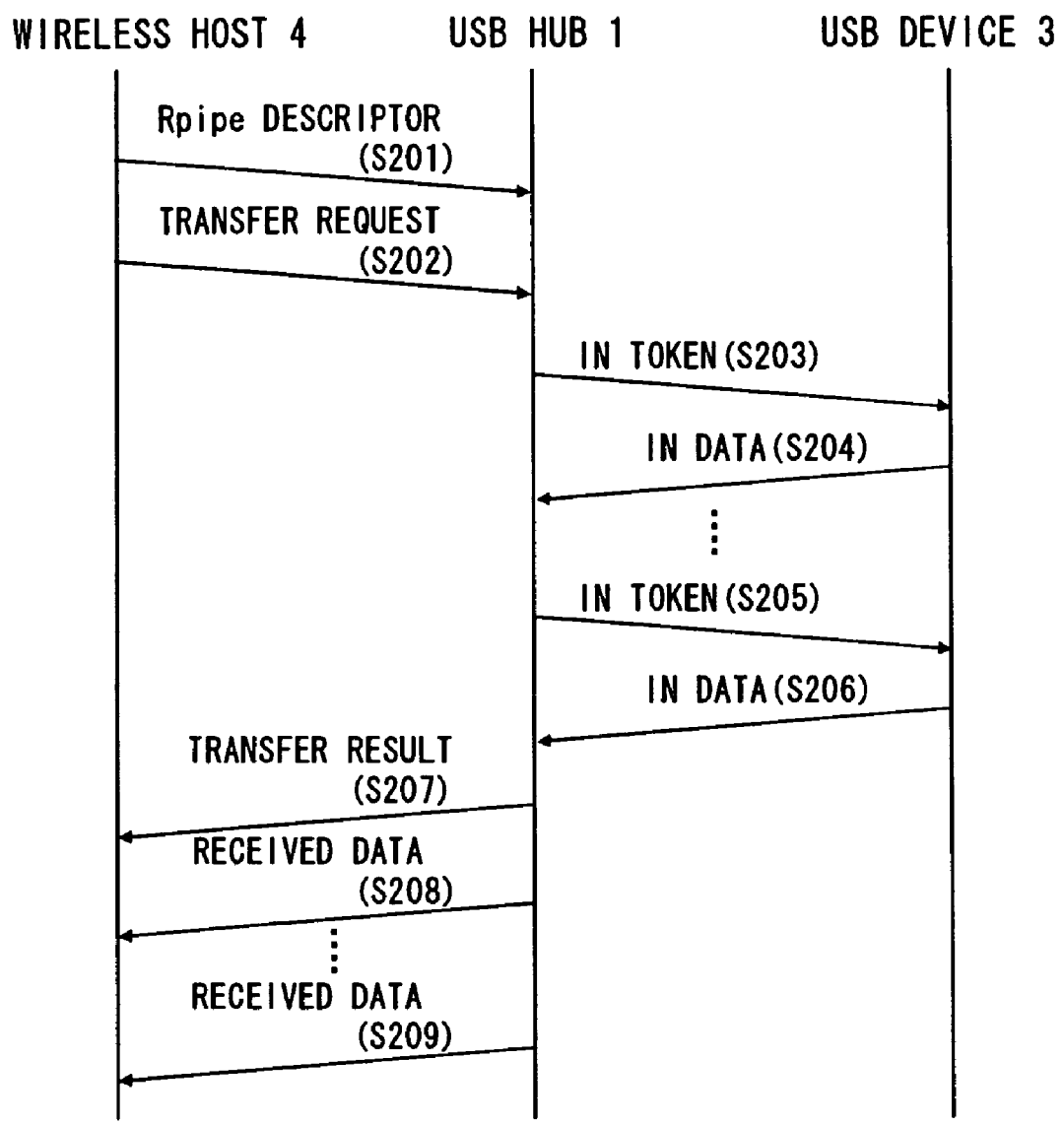
FIG. 3 is a timing chart showing how data is transferred via the USB hub according to the first embodiment of the present invention.

Referring first to timing charts of FIGS. 2 and 3, a communication procedure between the wireless host 4 and the USB devices 3 is described. FIG. 2 shows a procedure for transmitting data from the wireless host 4 to the USB devices 3. First, prior to the data transfer, the wireless host 4 sends an RPipe descriptor to the USB hub 1 (S101). Here, the RPipe descriptor includes attribute information of the USB device 3 necessary for communications between the USB hub 1 and the USB devices 3. An attribute type specified by the RPipe descriptor is defined by the wireless USB standard.

Figure 4:
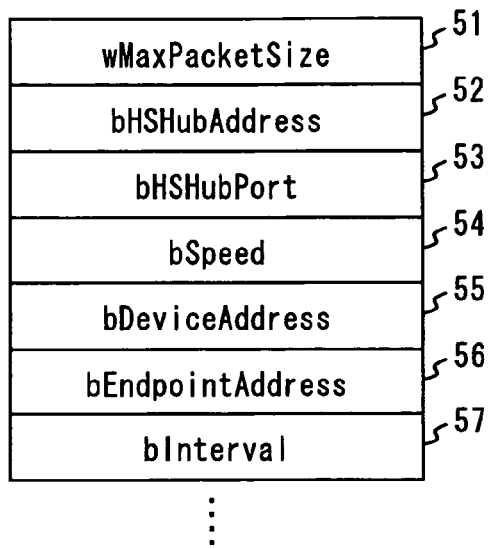
FIG. 4 shows an example of an RPipe descriptor.

FIG. 4 shows a specific example of the RPipe descriptor. An RPipe descriptor 50 of FIG. 4 includes addresses of downstream USB devices (bDeviceAddress 55 and bHSHubAddress 52), an endpoint address (bEndpointAddress 56), the maximum packet size at an endpoint (wMaxPacketSize 51), a data transfer speed (bSpeed 54), and a data transfer interval (binterval 57).

Referring to the received RPipe descriptor, the USB hub 1 determines a data transfer type, a data size, a data transfer interval, and a transfer speed for sending data to the downstream USB devices 3.

Next, the wireless host 4 sends a transfer request to the USB hub 1 (S102). The transfer request requires data transfer from the wireless host 4 to the USB devices 3, in other words, requires the USB devices 3 to receive data. In the following description about this procedure, data transferred from the wireless host 4 to the USB devices 3 is referred to as "transmission data". The wireless host 4 sends transmission data after the transfer request, and the USB hub 1 receives the data (S103). The transmission data is sent from the wireless host 4 in small batches in accordance with its data amount (S104).

After the USB hub 1 received the transmission data, the USB hub 1 executes OUT transactions with the USB devices 3 in order to transfer the transmission data sent from the wireless host 4 to the USB devices 3. The OUT transactions are executed in conformity with the USB1.x standard or USB 2.0 standard. To elaborate, after the USB hub 1 sent OUT token packets to the USB devices 3, data received from the wireless host 4 is sent to the USB devices 3 as OUT data (S105 and S106). Here, the OUT data means data to be transmitted from the USB host to the USB device based on the USB standard. The OUT data is transmitted in plural OUT transactions in accordance with its data amount (S107 and S108)

At the completion of the transfer of data requested by the wireless host 4 toward the USB devices 3, the USB hub 1 sends a result of data transfer to the USB devices 3 to the wireless host 4 (S109).

Meanwhile, FIG. 3 shows a procedure for transmitting data from the USB devices 3 to the wireless host 4. First, prior to the data transfer, the wireless host 4 sends the RPipe descriptor to the USB hub 1 (S201). Next, the wireless host 4 sends a transfer request to the USB hub 1 (S202). The transfer request requires data transfer from the USB devices 3 to the wireless host 4, in other words, requires the USB devices 3 to send data. In the following description about this procedure, data to be transferred from the USB devices 3 to the wireless host 4 is referred to as "reception data".

The USB hub 1 receives the transfer request and then sends IN token packets to the USB devices 3 for requesting the USB devices 3 to send data (S203). The USB devices 3 receive the IN token packets and then send requested data to the USB hub 1 (S204). A data transfer between The USB hub 1 and the USB devices 3 is executed by dividing transfer data into plural IN transactions according to an amount of transfer data (S205 and S206).

After receiving the data requested by the wireless host 4 from the USB devices 3, the USB hub 1 sends a result of data transfer with the USB devices 3 to the wireless host 4 (S207). Following this, the USB hub 1 sends reception data to the wireless host 4 (S208). The reception data is sent from the USB hub 1 in small batches in accordance with its data amount (S209).

As in the above procedure, the data transfer between the wireless host 4 and the USB devices 3 can be executed by mediating role of the USB hub 1.

Figure 5:
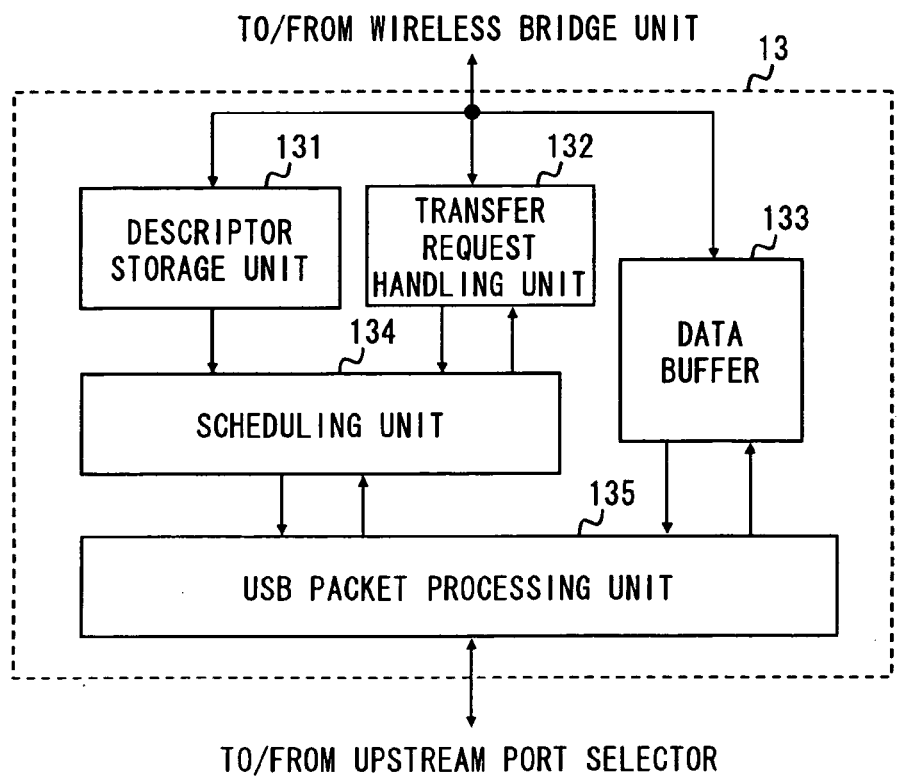
FIG. 5 shows a structural example of a wired USB host functional part.

Subsequently, structures of the wired USB host functional part 13 and the wireless bridge unit 14 of the USB hub 1 are described. FIG. 5 shows the structure of the wired USB host functional part 13. A descriptor storage unit 131 stores the RPipe descriptor received from the wireless host 4.

A transfer request handling unit 132 accepts and stores a transfer request sent from the wireless host 4. Further, the transfer request handling unit 132 requests a scheduling unit 134 to execute transactions with the USB devices 3 in response to the received transfer request. Moreover, after the completion of the processings based on the transfer request, the transfer request handling unit 132 creates information about the transfer result including the result of processings based on the transfer request to send the information to the wireless host 4 via the wireless bridge unit 14 and the wireless upstream port 46.

A data buffer 133 stores data to be sent to the USB devices 3, and data sent from the USB devices 3.

The scheduling unit 134 determines a data transfer type, a data size, a data transfer interval, and a transfer speed for sending data to the USB devices 3 with reference to the RPipe descriptor stored in the descriptor storage unit 131. Here, the data transfer type means a token packet type such as SETUP, IN, or OUT. The token packet type is determined based on a data transmission type at an endpoint such as controlled transmission, bulk transmission, interrupt transmission, or isochronous transmission. Further, the scheduling unit 134 schedules transactions with the USB devices 3 in response to a request of the transfer request handling unit 132. Moreover, in order to execute the scheduled transactions, the scheduling unit 134 requests a USB packet processing unit 135 to generate token packets and data packets in accordance with a data transfer type and a data transfer interval determined with reference to the RPipe descriptor.

The USB packet processing unit 135 generates token packets and data packets in response to a request of the scheduling unit 134. In the case of sending data to the USB devices 3, transfer data is read from the data buffer 133 to generate OUT data packets. The generated token packets and data packets are sent to the upstream port selector 12. Further, the USB packet processing unit 135 stores data packets received from the USB devices 3 in the data buffer 133.

Figure 6:
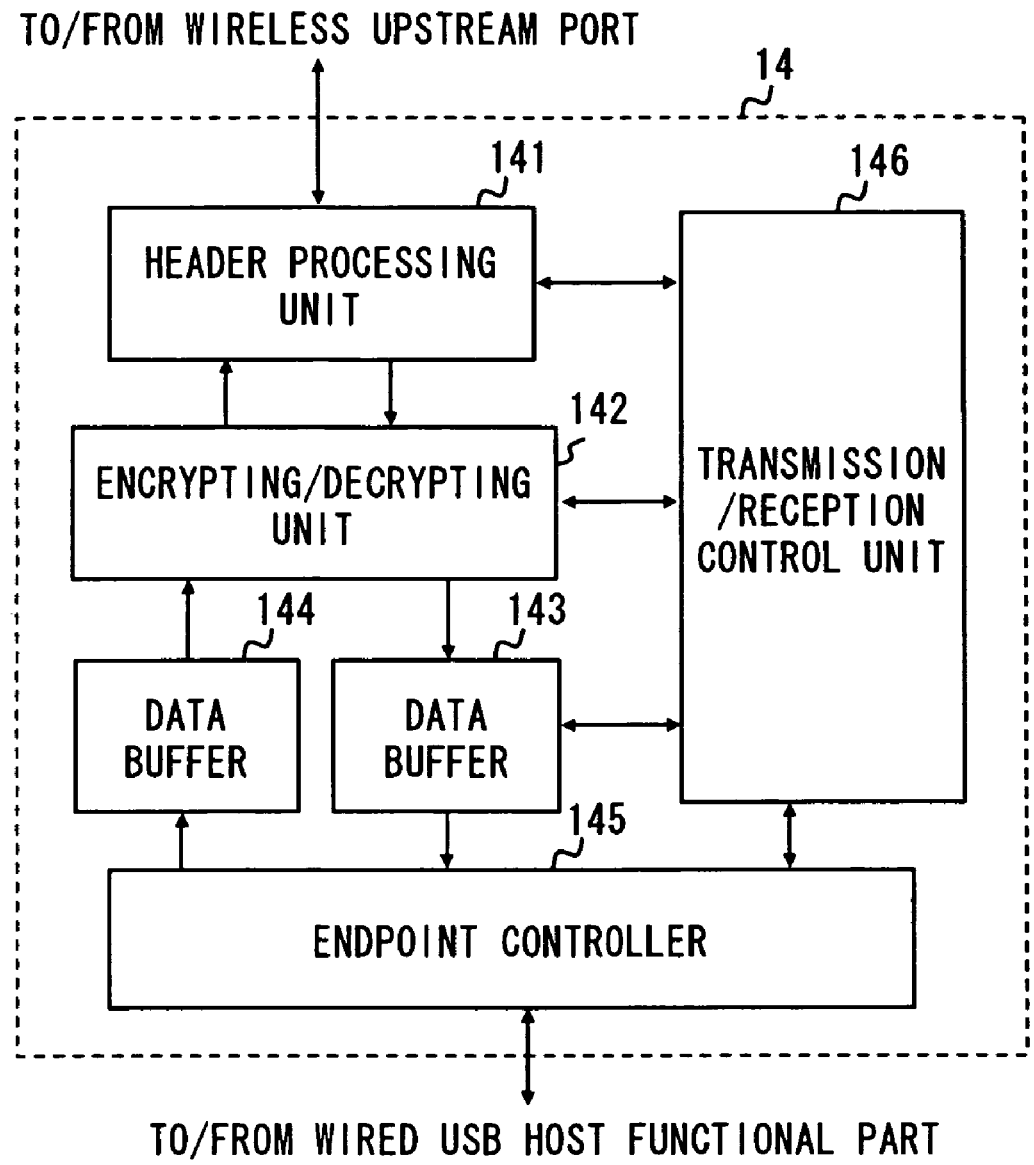
FIG. 6 shows a structural example of a wireless bridge unit.

Referring next to FIG. 6, the structure of the wireless bridge unit 14 is described. FIG. 6 shows the structure of the wireless bridge unit 14. A header processing unit 141 removes a MAC header and a PHY header from data received from the wireless host 4. Further, the header processing unit 141 adds a MAC header and a PHY header to data to be sent to the wireless host 4, and the header-added data is output to the wireless upstream port 46 in accordance with a timing specified by a transmission/reception control unit 146.

An encrypting/decrypting unit 142 decodes data received from the wireless host 4 and encodes data to be sent to the wireless host 4.

A data buffer 143 stores data received from the wireless host 4. Further, a data buffer 144 stores data sent to the wireless host 4.

An endpoint controller 145 references a wireless USB header added to data sent from the wireless host 4 and stored in the data buffer 143, and controls an endpoint for data transmission/reception to/from the wireless host 4. Further, the endpoint controller adds a wireless USB header to data received from the wired USB host functional part 13 and sent to the wireless host 4, and stores the data in the data buffer 144.

Figure 10:
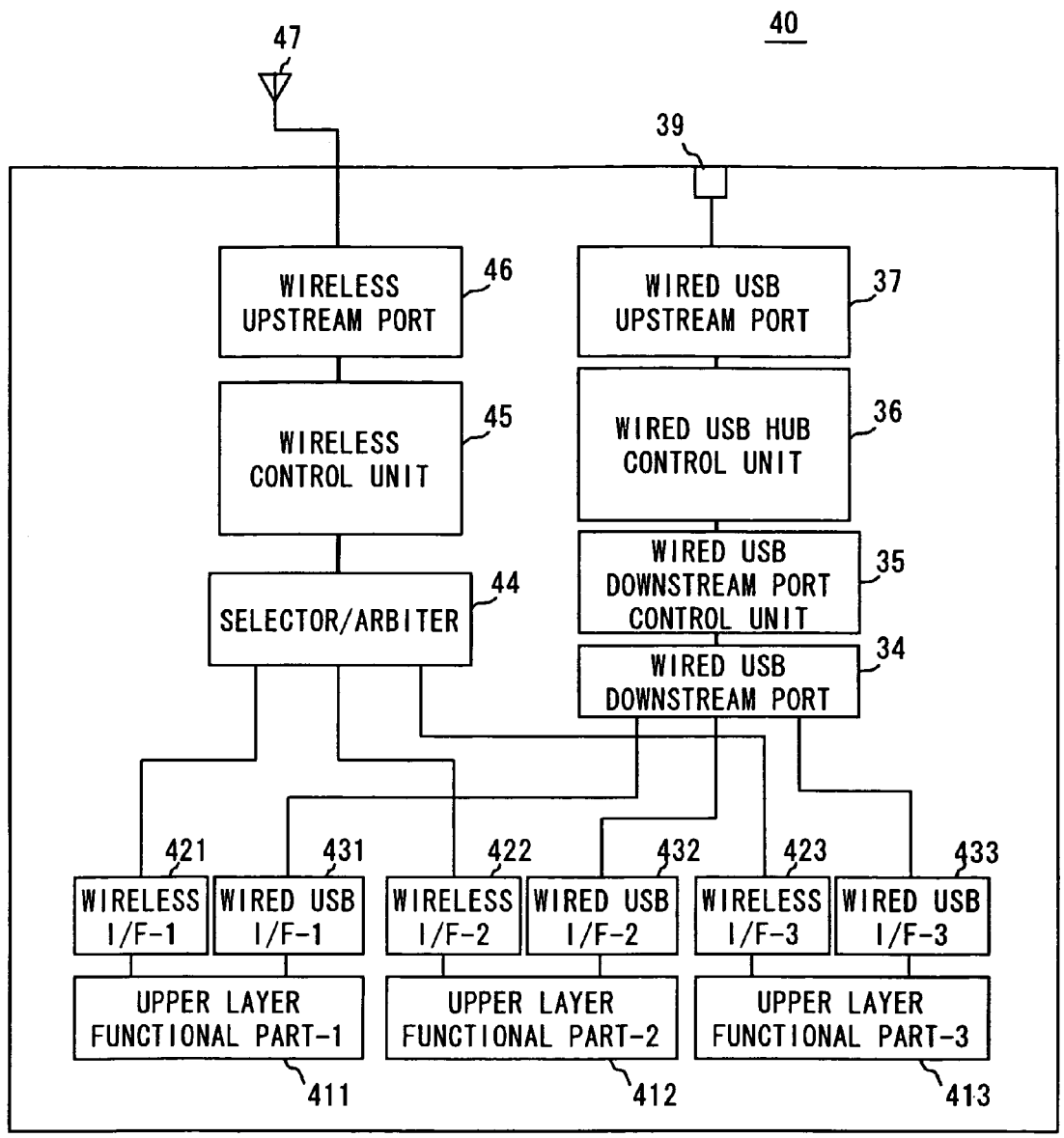
FIG. 10 is a diagram of a USB-compliant apparatus for explaining a problem to be solved by the invention.

In the structure of FIG. 10, different interfaces are used for the wireless control unit 45 and the wired USB hub control unit 36, so two interface units adapted for the wired USB communication method and the wireless communication method for the upstream side should be provided to each of upper layer functional parts 411 to 413. As a result, it is difficult to downsize an apparatus.

In contrast, according to the USB hub 1 and the USB hub/controller IC 10 of this embodiment, signals input to/output from the wired USB hub control unit 36 and the wired USB host functional part 13 conform to the same signal format, and the upstream port selector 12 switches the wired USB hub control unit 36 and the wired USB host functional part 13 to be connected with the wired USB downstream port control unit 35. Thus, in a hub apparatus including both of the wired USB upstream port 37 and the wireless upstream port 46, the wired USB downstream port control unit 35 and the wired USB downstream port 34 are shared. Hence, the same interface may be used for each of the wired USB downstream ports, and interfaces with downstream devices can be standardized into a wired USB interface. With such a structure, the USB hub 1 incorporating the USB hub/controller IC 10 of this embodiment can simplify the structure of a portion necessary for converting the interfaces and enables a smaller apparatus size than a USB-compliant apparatus 4 of FIG. 10.

Incidentally, the upstream port selector 12 may explicitly switch the wired USB host functional part 13 and the wired USB hub control unit 36 to be connected with the wired USB downstream port control unit 35 based on a control signal input from the outside of the USB hub 1. Alternatively, a DIP switch or other such switches may be provided to the USB hub 1, and the switch is turned on/off, whereby the upstream port selector 12 may select one of the wireless upstream port 46 and the wired USB upstream port 37. Alternatively, when the USB hub 1 detects that a receptacle 39 is connected with a USB cable or that the wired USB upstream port 37 is normally connected with the USB host 2 via the receptacle 39, the wired USB upstream port 37 may be selected; otherwise, the wireless upstream port 46 may be selected.

Further, it is desirable to bring the unselected upstream port into an inactive state or suspend state of performing minimum operation (hereinafter, referred to as "standby state") in accordance with the aforementioned selecting operation of the upstream port selector 12. For example, if the upstream port selector 12 selects the wired USB upstream port 37, the wireless upstream port 46, the wireless bridge unit 14, and the wired USB host functional part 13 are brought into a standby state. Conversely, if the upstream port selector 12 selects the wireless upstream port 46, the wired USB upstream port 37 and the wired USB hub control unit 36 are brought into a standby state. In this way, the functional parts not involved in communications come to a standby state, thereby saving the power consumption of the USB hub 1.

Further, in the above description about the USB hub/controller IC 10 of FIG. 1, all functional parts are encapsulated into one package. However, the USB hub/controller IC 10 may be composed of plural packages each including one or plural functional parts of the USB hub/controller IC 10.

Second Embodiment

Figure 7:
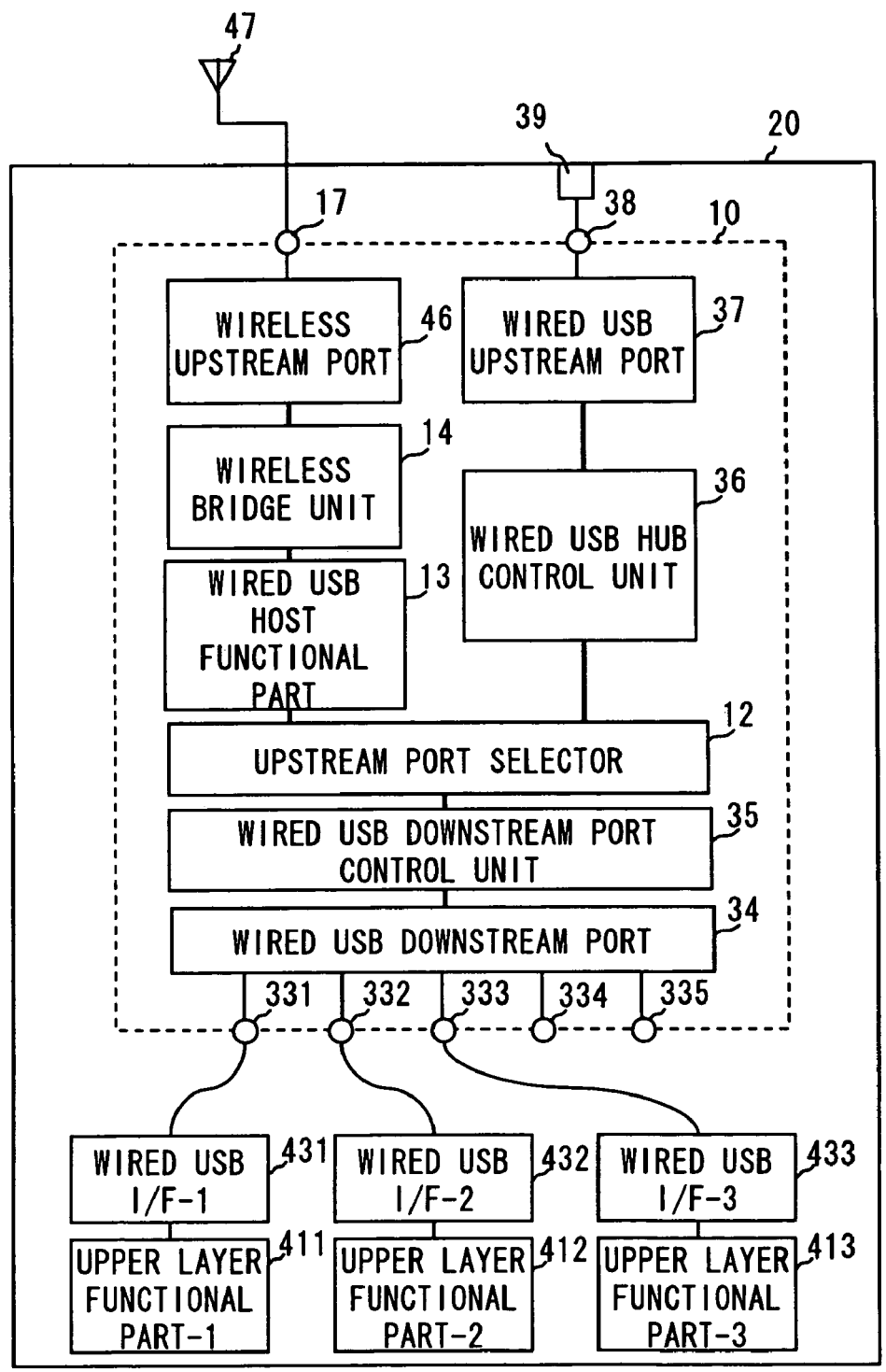
FIG. 7 is a diagram of a USB-compliant apparatus according to a second embodiment of the present invention.

FIG. 7 shows the structure of a USB-compliant apparatus 20 according to a second embodiment of the present invention. The USB-compliant apparatus 20 has a feature that an upstream communication method is switched between a communication method conforming to the USB 2.0 standard (wired USB) and the wireless communication method by use of the USB hub/controller IC 10 of the first embodiment.

In the USB-compliant apparatus 20 according to this embodiment, downstream interfaces of the USB hub/controller IC 10 are standardized into the wired USB interface, so interfaces in the apparatus can be standardized into the wired USB interface irrespective of whether the upstream communication is wired USB communication or wireless communication. To be specific, interfaces between the upper layer functional parts 411 to 413 and the USB hub/controller IC 10 can be standardized as wired USB I/Fs 431 to 433.

This structure has an advantage in that the USB-compliant apparatus 20 can be manufactured, and especially, the upper layer functional parts 411 to 413 can be designed and manufactured regardless of plural I/Fs as the interfaces in the apparatus and communication protocols.

Incidentally, components of the USB-compliant apparatus 20 are the same as those of the USB-compliant apparatus 40 of FIG. 10 and those of the USB hub 1 according to the first embodiment, so their detailed description is omitted here.

Third Embodiment

Figure 8:
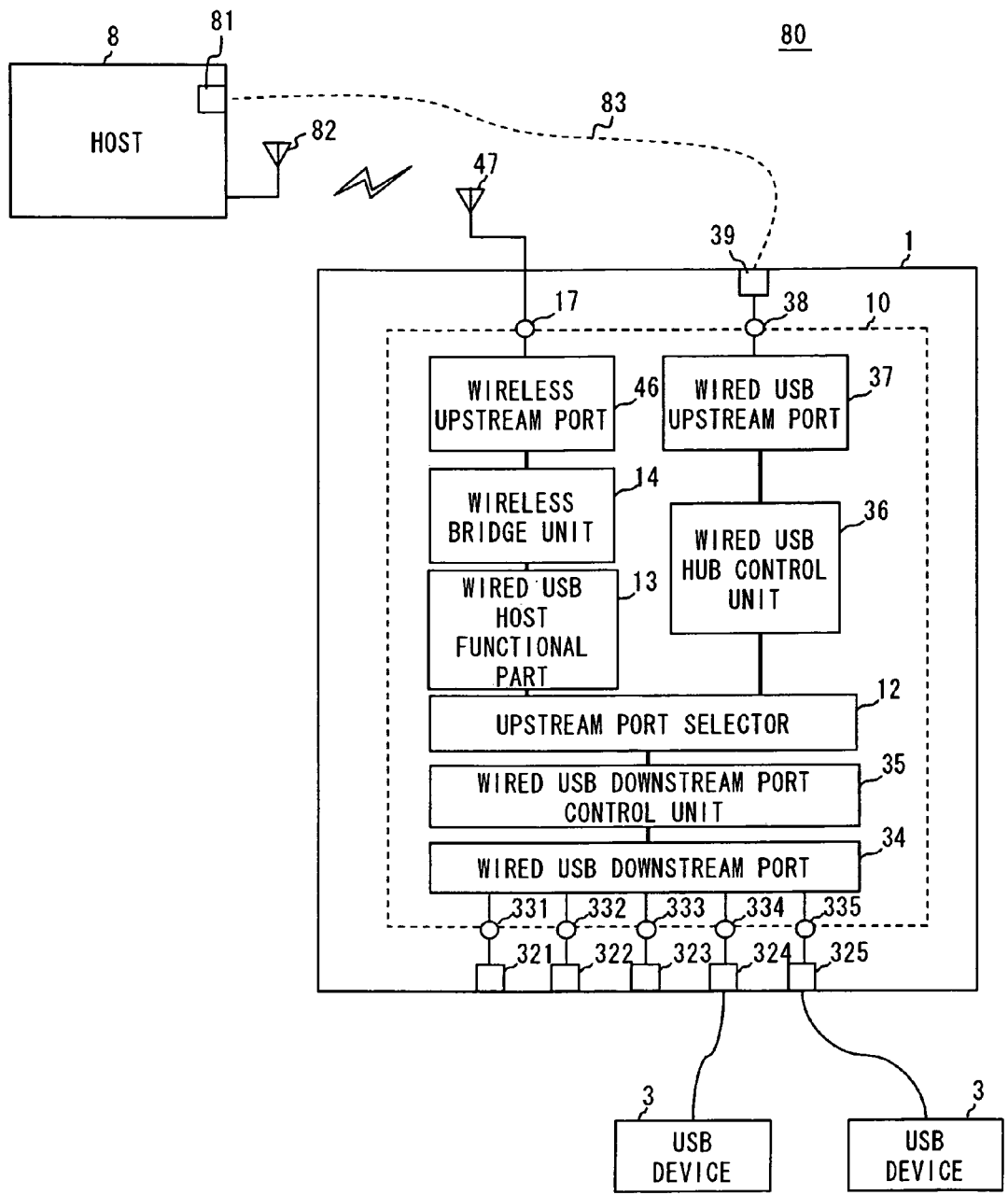
FIG. 8 is a diagram of a USB communication system according to a third embodiment of the present invention.

FIG. 8 shows the structure of a USB communication system 80 according to a third embodiment of the present invention. The USB hub 1 and the USB devices 3 of the USB communication system 80 are the same as those of the first embodiment.

A host 8 includes both of a wired interface and a wireless interface which can communicate with the USB hub 1. That is, the host is an apparatus functioning as both of the USB host 2 and the wireless host 4 as shown in FIG. 1. A USB port 81 is connected with the wired USB upstream port 37 via a USB cable 83 and the receptacle 39 to allow the host 8 to communicate with the USB hub 1 in accordance with the USB protocol. Further, the host 8 and the USB hub 1 can communicate with each other while exchanging data between an antenna 82 and the antenna 47 by radio.

As mentioned above, the host 8 functioning as both of the USB host 2 and the wireless host 4 may communicate with the USB hub 1. For example, in the case where a stable, high-speed data transfer between the host 8 and the USB hub 1 is required, the case where the use of radio waves is restricted, and the case where a sufficient wireless communication quality is not ensured due to an influence of fading, the wired communication via the USB cable 83 is suitably adopted. In contrast, in the case where the USB hub 1 and the connected USB devices 3 are freely placed independently of the host 8, the wireless communication between the antenna 82 and the antenna 47 is suitably adopted.

The USB communication system 80 of this embodiment can change a communication form between the host 8 and the USB hub 1 depending on environments surrounding the host 8, the USB hub 1, and the devices 3, and communication bands necessary for the host 8 or the devices 3 and can be applied to various use environments and applications.

It is apparent that the present invention is not limited to the above embodiment that may be modified and changed without departing from the scope and spirit of the invention.

What is claimed is:

1. A USB hub, comprising:
   a USB upstream port unit for inputting/outputting data from/to a USB host in accordance with a USB protocol;
   a wireless upstream port unit for inputting/outputting data from/to a wireless host in accordance with a predetermined wireless communication protocol;
   a USB downstream port unit including at least one input/output port for inputting/outputting data from/to a USB device in accordance with the USB protocol;
   a port selector configured to selectively connect either the USB upstream port unit to the USB downstream port unit or the wireless upstream port unit to the USB downstream port unit; and
   a communication protocol converting unit, provided on a connection path between the wireless upstream port unit and the port selector, and configured to convert the USB protocol and the wireless communication protocol.

2. The USB hub according to claim 1, wherein the communication protocol converting unit includes:
a USB host functional part acting as a USB host for the USB device connected to the USB downstream port unit; and
a wireless bridge unit for relaying data between the wireless upstream port unit and the USB host functional part.

3. The USB hub according to claim 1, wherein the port selector switches a path connected to the USB downstream port unit based on an externally supplied control signal.

4. The USB hub according to claim 1, wherein the port selector switches a path connected to the USB downstream port unit based on whether or not the USB upstream port unit can input/output data to/from the USB host.

5. The USB hub according to claim 1, wherein an operational state of at least one of the wireless upstream port unit and the communication protocol converting unit is changed depending on whether or not the communication protocol converting unit is selected to be connected with the USB downstream port unit by the port selector.

6. The USB hub according to claim 1, wherein an operation of at least one of the wireless upstream port unit and the communication protocol converting unit is stopped based on a situation that the USB upstream port unit is selected to be connected with the USB downstream port unit.

7. The USB hub according to claim 1, wherein an operation of the USB upstream port unit is stopped based on a situation that the wireless upstream port unit and the communication protocol converting unit are selected to be connected with the USB downstream port unit.

8. The USB hub according to claim 1, wherein an operational state of at least one of the USB upstream port unit and the wireless upstream port unit is changed according as the port selector switches a path connected to the USB downstream port unit.

9. A USB-compliant apparatus, comprising:
a USB upstream port unit for inputting/outputting data from/to a USB host in accordance with a USB protocol;
a wireless upstream port unit for inputting/outputting data from/to a wireless host in accordance with a predetermined wireless communication protocol;
at least one upper layer functional part acting as a USB device for inputting/outputting data in accordance with the USB protocol;
a port selector configured to selectively connect either the USB upstream port unit to the USB downstream port unit or the wireless upstream port unit to the upper layer functional part; and
a communication protocol converting unit, provided on a connection path between the wireless upstream port unit and the port selector, and configured to convert the USB protocol and the wireless communication protocol.

10. The USB-compliant apparatus according to claim 9, wherein the communication protocol converting unit includes:
a USB host functional part acting as a USB host for the upper layer functional part; and
a wireless bridge unit for relaying data between the wireless upstream port unit and the USB host functional part.

11. The USB-compliant apparatus according to claim 9, wherein the port selector switches a path connected to the upper layer functional part based on an externally supplied control signal.

12. The USB-compliant apparatus according to claim 9, wherein the port selector switches a path connected to the upper layer functional part based on whether or not the USB upstream port unit can input/output data to/from the USB host.

13. The USB-compliant apparatus according to claim 9, wherein an operational state of at least one of the wireless upstream port unit and the communication protocol converting unit is changed depending on whether or not the communication protocol converting unit is selected to be connected with the upper layer functional part by the port selector.

14. The USB-compliant apparatus according to claim 9, wherein an operation of at least one of the wireless upstream port unit and the communication protocol converting unit is stopped based on a situation that the USB upstream port unit is selected to be connected with the upper layer functional part.

15. The USB-compliant apparatus according to claim 9, wherein an operational state of at least one of the USB upstream port unit and the wireless upstream port unit is changed according as the port selector switches a path connected to the upper layer functional part.

16. A communication system, comprising:
a USB hub including:
a USB upstream port unit for inputting/outputting data in accordance with a USB protocol;
a wireless upstream port unit for inputting/outputting data in accordance with a predetermined wireless communication protocol;
a USB downstream port unit including at least one input/output port for inputting/outputting data in accordance with the USB protocol;
a port selector configured to selectively connect either the USB upstream port unit to the USB downstream port unit or the wireless upstream port unit to the USB downstream port unit; and
a communication protocol converting unit, provided on a connection path between the wireless upstream port unit and the port selector, and configured to convert the USB protocol and the wireless communication protocol,
a host including:
a USB port unit capable of transmitting/receiving data to/from the USB upstream port unit in accordance with the USB protocol; and
a wireless port unit capable of transmitting/receiving data to/from the wireless upstream port unit in accordance with the wireless communication protocol; and
a USB device connected with the USB downstream port unit and communicating with the host via the USB hub,
wherein the host selects one of the USB port unit and the wireless port unit to transmit/receive data to/from the USB hub.

17. The communication system according to claim 16, wherein the port selector switches a path connected to the USB downstream port unit based on an externally supplied control signal.

18. The communication system according to claim 16, wherein the port selector switches a path connected to the USB downstream port unit based on whether or not the USB upstream port unit can input/output data to/from the host.

19. The communication system according to claim 16, wherein an operational state of at least one of the wireless upstream port unit and the communication protocol converting unit is changed depending on whether or not the communication protocol converting unit is selected to be connected with the USB downstream port unit by the port selector.

20. The communication system according to claim 16, wherein an operation of at least one of the wireless upstream port unit and the communication protocol converting unit is stopped based on a situation that the USB upstream port unit is selected to be connected with the USB downstream port unit.

21. The communication system according to claim 16, wherein an operational state of at least one of the USB upstream port unit and the wireless upstream port unit is changed according as the port selector switches a path connected to the USB downstream port unit.

* * * * *